United States Patent
Agarwala et al.

(10) Patent No.: US 7,047,284 B1
(45) Date of Patent: May 16, 2006

(54) TRANSFER REQUEST BUS NODE FOR TRANSFER CONTROLLER WITH HUB AND PORTS

(75) Inventors: Sanjive Agarwala, Richardson, TX (US); David A. Comisky, Plano, TX (US); Charles L. Fuoco, Allen, TX (US); Iain Robertson, Bedforshire (GB); David Hoyle, Glendale, AZ (US); John Keay, Bedfordshire (GB); Keith Balmer, Bedford (GB); Amarjit S. Bhandal, Northants (GB); Christopher L. Mobley, Coppell, TX (US)

(73) Assignee: Texas Instruments Incorporated, Dallas, TX (US)

( * ) Notice: Subject to any disclaimer, the term of this patent is extended or adjusted under 35 U.S.C. 154(b) by 791 days.

(21) Appl. No.: 09/713,440

(22) Filed: Nov. 15, 2000

Related U.S. Application Data

(60) Provisional application No. 60/173,763, filed on Dec. 30, 1999.

(51) Int. Cl.
  *G06F 15/177* (2006.01)
(52) U.S. Cl. .................. 709/220; 709/223; 709/221; 709/222; 370/231; 370/236
(58) Field of Classification Search ............... 709/220, 709/221, 223
  See application file for complete search history.

(56) References Cited

U.S. PATENT DOCUMENTS

| 4,982,400 | A | * | 1/1991 | Ebersole ................... 370/407 |
| 5,724,507 | A | * | 3/1998 | Iwatsuki et al. ............ 709/250 |
| 6,105,079 | A | * | 8/2000 | Kuo et al. .................. 710/25 |
| 6,408,351 | B1 | * | 6/2002 | Hamdi et al. ............... 710/63 |

* cited by examiner

*Primary Examiner*—Jason Carrone
*Assistant Examiner*—Adnan M. Mirza
(74) *Attorney, Agent, or Firm*—Robert D. Marshall, Jr.; W. James Brady III; Frederick J. Telecky, Jr.

(57) ABSTRACT

A transfer request bus and transfer request bus node is described which is suitable for use in a data transfer controller processing multiple concurrent transfer requests despite the attendant collisions which result when conflicting transfer requests occur. Transfer requests are passed from an upstream transfer request node to downstream transfer request node and then to a transfer request controller with queue. At each node a local transfer request can also be inserted to be passed on to the transfer controller queue. Collisions at each transfer request node are resolved using a token passing scheme wherein a transfer request node possessing the token allows a local request to be inserted in preference to the upstream request.

10 Claims, 5 Drawing Sheets

TRANSFER REQUEST BUS NODE FOR TRANSFER CONTROLLER WITH HUB AND PORTS

This application claims priority under 35 USC §119(e)(1) of Provisional Application No. 60/173,763, filed Dec. 30, 1999.

TECHNICAL FIELD OF THE INVENTION

The technical field of this invention is digital device functional blocks, which relates generally to the area of microprocessor design and relates more specifically to the area of digital signal processor devices. In particular this invention relates to distributed service request busses such as data transfer request busses.

BACKGROUND OF THE INVENTION

The present invention deals with the data transfer connecting various memory port nodes as applied to the transfer controller with hub and ports, which is the subject of U.S. Pat. No. 6,496,740 claiming priority from U.K. Patent Application Number 9909196.9 filed Apr. 10, 1999. The transfer controller with hub and ports is a significant basic improvement in data transfer techniques in complex digital systems and provides many useful features, one of which is the internal memory port which allows connection of a virtually unlimited number of processor/memory nodes to a centralized transfer controller. The centralized transfer controller must be able to transfer data from node to node with performance relatively independent of how near or remote a node might be from the transfer controller itself. To clarify the problem solved by the present invention, it is helpful to review the characteristics, architecture, and functional building blocks of the transfer controller with hub and ports.

The system problem addressed by this invention is that of sending service transaction requests from many sources. The many sources may be on a single silicon chip. The transaction requests are sent to a common central resource such as a conventional transfer controller. In the preferred embodiment the transfer controller with hub and ports is the subject of the above named patent application. The service requests are contained in transaction request packets composed of words, each of which may be many bits wide.

The conventional approach would be to provide dedicated buses from each potential requester to the controller. This construction has several disadvantages. It is inherently complex and requires costly hardware because the transaction requests must be serviced in parallel. The more potential requesters, the more complex such a system must be.

Non-parallel transaction processing is an alternative. This requires a centralized arbiter to determine order of servicing on service request collisions. This alternative must also force each non-serviced source to re-submit requests until acknowledged and handled. With either parallel or non-parallel transaction processing, the transaction processor would require extensive modifications for each new design adding or removing requesters. This results in poor re-usability of chip module designs, making poor use of the scarce resource of design engineers. Additionally, requesters distant from the centralized transaction processor would have longer buses. This requires extra design attention or hardware to ensure that signal paths would not be slow.

These basic limitations to conventional data transfer techniques led to the initial development of the transfer controller with hub and ports. This transfer controller is a unique mechanism that consolidates the functions of a transfer controller and other data movement engines in a digital signal processor system (for example, cache controllers) into a single module.

Consolidation of such functions has both advantages and disadvantages. The most important advantage of consolidation is that it will, in general, save hardware since multiple instantiations of the same type of address generation hardware will not have to be implemented.

On a higher level, it is also advantageous to consolidate address generation since it inherently makes the design simpler to modify from a memory-map point of view. For example, if a peripheral is added or removed from the system, a consolidated module will be the only portion of the design requiring change. In a distributed address system (multi-channel transfer controller for example), all instances of the controller channels would change, as would the digital signal processor memory controllers.

Fundamental disadvantages of the consolidated model, however, are its inherent bottle necking, resulting from conflicting multiple requests, and its challenge to higher clock rates. Additionally, there is in general an added complexity associated with moving to a consolidated address model, just because the single module is larger than any of the individual parts it replaces.

The transfer controller with hub and ports, to which this invention relates, is a highly parallel and highly pipelined memory transaction processor. This transfer controller with hub and ports serves as a backplane to which many peripheral and/or memory ports may be attached.

Systems which contain a central mechanism for processing multiple transfer requests from multiple transfer request nodes have as an immediate challenge to solve the problem: how are conflicting transfers, i.e. transfer collisions, to be arbitrated.

In networking applications as an example, some systems technique of collision detection and random backoff to provide fair access to the network. Any station can start transmitting when it sees no activity on the network. However, in the unarbitrated state, it is possible for multiple stations to start transmitting simultaneously. Stations do not negotiate for ownership of the network. Instead stations check for the conflicting condition by receiving back what was transmitted, and checking to see if it has been corrupted (indicating a collision with another station). If this happens, all stations that started transmission simultaneously will detect the collision and abort their transmission. These stations then wait a random amount of time before attempting to start transmitting again. As each station will pick a random delay, each station eventually gets to transmit its data. Over time this system could provide fair access to all stations.

Other networking systems use a technique of passing a token between the stations. A station can start transmitting only if it has the token. When it has finished, it passes the token to the next station, which can either take it and transmit data, or pass the token on again if it is not ready to transmit. This system is very fair, but is somewhat more complex and costly to implement.

A centralized data transfer controller handling multiple simultaneous data transfer requests must be designed to manage the number of independent data transfer requests in a manner which solves these collision incidents unequivocally and any system design faces obvious compromises.

In DSP processors there is typically a DMA mechanism to do explicit data moves from one memory space to another in the address map. Also typically there are multiple requestors seeking DMA transfers. In a uni-processor there are multiple requestors like CPU, memory system (12), autonomous DMA controller (XDMA) and external bus mastering peripherals (host port interface devices HPI). Moreover on a multi-processor configuration on a single chip, it would be desirable to seamlessly share the DMA mechanism between the multiple processors. So the DMA request mechanism needs to be 'scalable' to accommodate different number of request nodes. Also it is desired to have a seamless interface to the requesting mechanism, and the details of the request transfer protocol should be hidden from the requesting node. Also the request interface needs to be simple to be able to integrate different kinds of request nodes.

SUMMARY OF THE INVENTION

This invention provides the solution to collision arbitration with fairness on a network of transfer request nodes. The network consists of one transfer request node per transfer requester, arranged in a transfer request bus. The transfer request bus starts at an upstream node and terminates downstream at a receiver node referred to as the request bus master input.

At each node, on a given clock cycle only one of two possible transfer requests can be transmitted. First, the previous upstream node can transmit a transfer request to the present node, which it retransmits downstream. Secondly, the requester attached to the present node itself can transmit a request to the next downstream node. Arbitration of which is to occur is done by a token passing scheme.

A token signal is active at only one node on the transfer request bus. This token is passed in a downstream direction around the transfer request nodes of the bus on each clock cycle. Thus one and only one transfer request node holds the token at any given time. The token is passed from the extreme downstream request node to the extreme upstream request node to form a token loop.

Arbitration of requests takes place as follows. If the present node is not ready to insert a transfer request from its transfer requester, then any upstream request is transmitted to the present node. This happens independent of whether the present node has the token. If the present node is ready to insert a request, it cannot occur except under certain conditions. If there is no request from an upstream node, then the present node may transmit its request downstream regardless of whether it has the token. If the present node receives a request from the immediate upstream node, then its action depends upon whether it holds the token. If the present node does not hold the token, then it must retransmit the request signal from the upstream node. If the present node holds the token, then it can transmit its own request. In this case the present node sends a stall signal to the next upstream node, stalling its request. No requests are aborted. Any previously stalled upstream requests may proceed as soon as the token passes from the present node.

The solution to the above problem involves integrating all the DMA requesting nodes in a ring topology. Also each DMA requestor in the chain instances a Transfer Request (TR) node. The TR node is the controller which handles all the transfer protocol and buffering. The bus which is comprised of a chain of all these transfer nodes is referred to as Transfer Request (TR) bus.

The Transfer Request (TR) Bus is a pipelined bus with TR nodes prioritizing and forwarding either their local request or the incoming upstream request. In case of both upstream and local request, the priority is based on a token passing scheme that allows a local request to be passed onto the TR bus only if the TR node has the token; otherwise the TR node will pass along the upstream request. In case where there is no upstream request, the TR node can pass the local request. The TR node will test for collisions on each subsequent local transfer request and follow the same protocol as above if a collision is detected. A pipelined stall will cause upstream requests to be held while the local transfer request is injected into the stream. FIG. 1 (Transfer Request Bus) is a block diagram of the transfer request bus.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
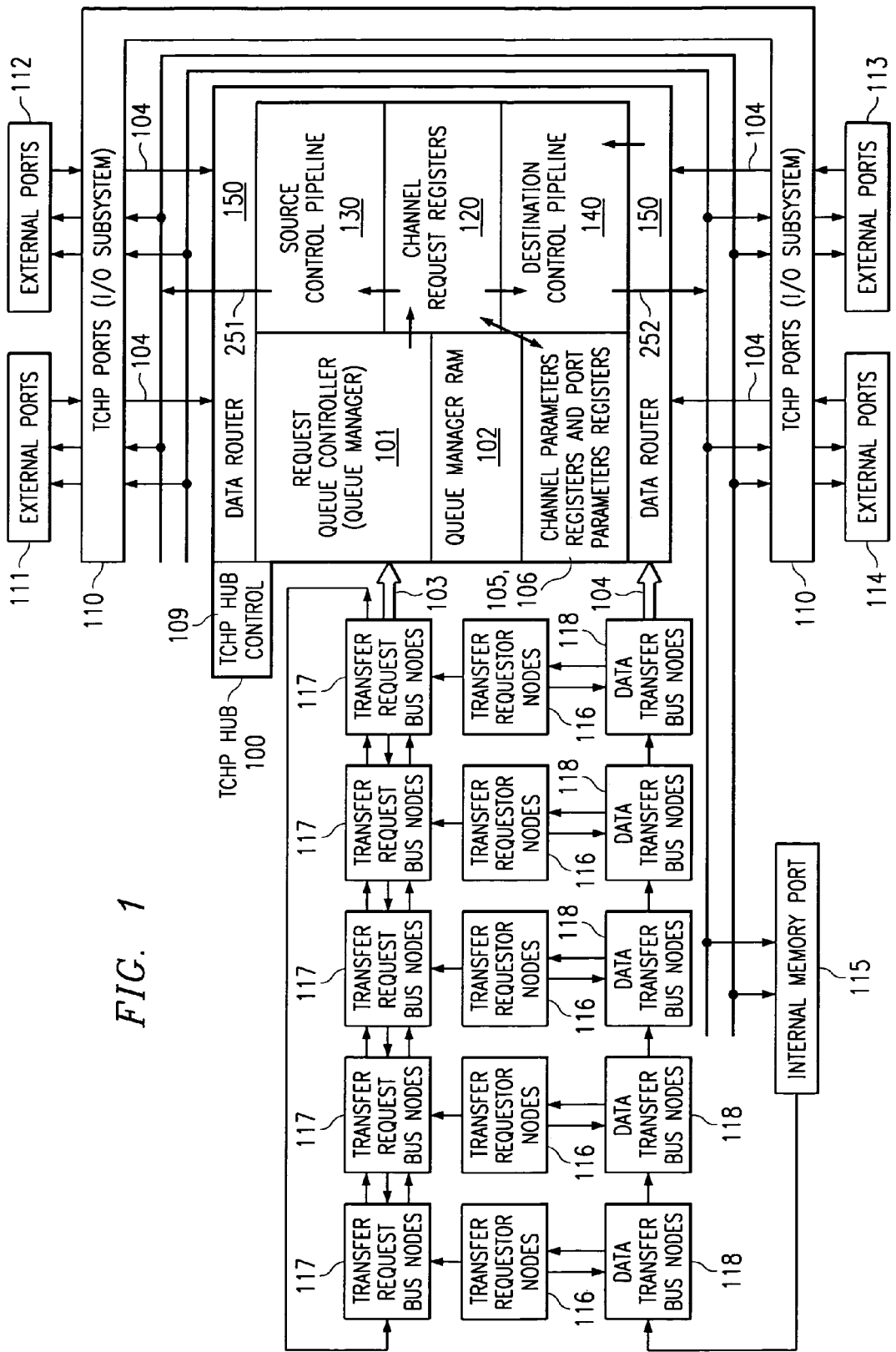
FIG. 1 illustrates a block diagram of the basic principal features of a transfer controller with hub and ports architecture.

The transfer controller with hub and ports architecture is optimized for efficient passage of data throughout a digital signal processor chip. FIG. 1 illustrates a block diagram of the principal features of the transfer controller with hub and ports. It consists of a system of a single hub 100 and multiple ports 111 through 115. At the heart of the hub is the transfer controller with hub and ports hub control unit 109 which acts upon request and status information to direct the overall actions of the transfer controller.

The transfer controller with hub and ports functions in conjunction with, first, a transfer request bus having a set of nodes 117 which bring in transfer request packets at input 103. These transfer request bus nodes (TR nodes) individually receive transfer request packets from transfer requesters 116 which are processor-memory nodes or other on-chip functions which send and receive data.

Secondly the transfer controller uses an additional bus, the data transfer bus having a set of nodes 118, to read or write the actual data at the requester nodes 116. The data transfer bus carries commands, write data and read data from a special internal memory port 115 and returns read data to the transfer controller hub via the data router 150 function at inputs 104.

The transfer controller has, at its front-end portion, a request queue controller 101 (also commonly referred to as the queue manager of this invention) receiving transfer requests in the form of transfer request packets at its input 103. The queue manager prioritizes, stores, and dispatches these as required.

The queue manager connects within the transfer controller hub unit 100 to the channel request registers 120 which receive the data transfer request packets and process them.

In this process, it first prioritizes them and assigns them to one of the N channel request registers 120, each of which represent a priority level.

If there is no channel available for direct processing of the transfer request packets, it is stored in the queue manager memory (usually a RAM) 102. The transfer request packet is then assigned at a later time when a channel becomes available. The channel registers interface with the source 130 and destination 140 control pipelines which effectively are address calculation units for source (read) and destination (write) operations.

Outputs from these pipelines are broadcast to M ports through the transfer controller ports I/O subsystem 110 which includes a set of hub interface units, which drive the M possible external ports units (four such external ports are shown in FIG. 1 as 111 through 114). The external ports units (also referred to as application units) are clocked either at the main processor clock frequency or at a lower (or higher) external device clock frequency. If a port operates at its own frequency, synchronization to the core clock is required.

As an example of read-write operations at the ports, consider a read from external port node 112 followed by a write to external port node 114. First the source pipeline addresses port 112 for a read. The data is returned to the transfer controller hub through the data router unit 150. On a later cycle the destination control pipeline addresses port 114 and writes the data at port 114. External ports as described here do not initiate transfer requests but merely participate in reads and writes requested elsewhere on the chip.

Read and write operations involving the processor-memory nodes (transfer requesters) 116 are initiated as transfer request packets on the transfer request bus 117. The queue manager 101 processes these as described above, and on a later cycle a source pipeline output (read command/address) is generated which is passed at the internal memory port to the data transfer bus 118 in the form of a read. This command proceeds from one node to the next in pipeline fashion on the data transfer bus. When the processor node addressed is reached, the read request causes the processor-memory node to place the read data on the bus for return to the data router 150.

On a later cycle, a destination pipeline output passes the corresponding write command and data to the internal memory port and on to the data transfer bus for writing at the addressed processor node.

The channel parameter registers 105 and port parameters registers 106 hold all the necessary parametric data as well as status information for the transfer controller hub pipelines to process the given transfer. Both pipelines share some of the stored information. Other portions relate specifically to one pipeline or the other.

The transfer controller with hub and ports introduced several new ideas supplanting the previous transfer controller technology. First, it is uniformly pipelined. In the previous transfer controller designs, the pipeline was heavily coupled to the external memory type supported by the device. In the preferred embodiment, the transfer controller with hub and ports contains multiple external ports, all of which look identical to the hub. Thus peripherals and memory may be freely interchanged without affecting the transfer controller with hub and ports. Secondly, the transfer controller with hub and ports concurrently executes transfers. That is, up to N transfers may occur in parallel on the multiple ports of the device, where N is the number of channels in the transfer controller with hub and ports core.

Each channel in the transfer controller with hub and ports core is functionally just a set of registers. These registers track the current source and destination addresses, the word counts and other parameters for the transfer. Each channel is identical, and thus the number of channels supported by the transfer controller with hub and ports is highly scalable. Thirdly, the transfer controller with hub and ports includes a mechanism for queuing transfers up in a dedicated queue RAM.

Figure 2:
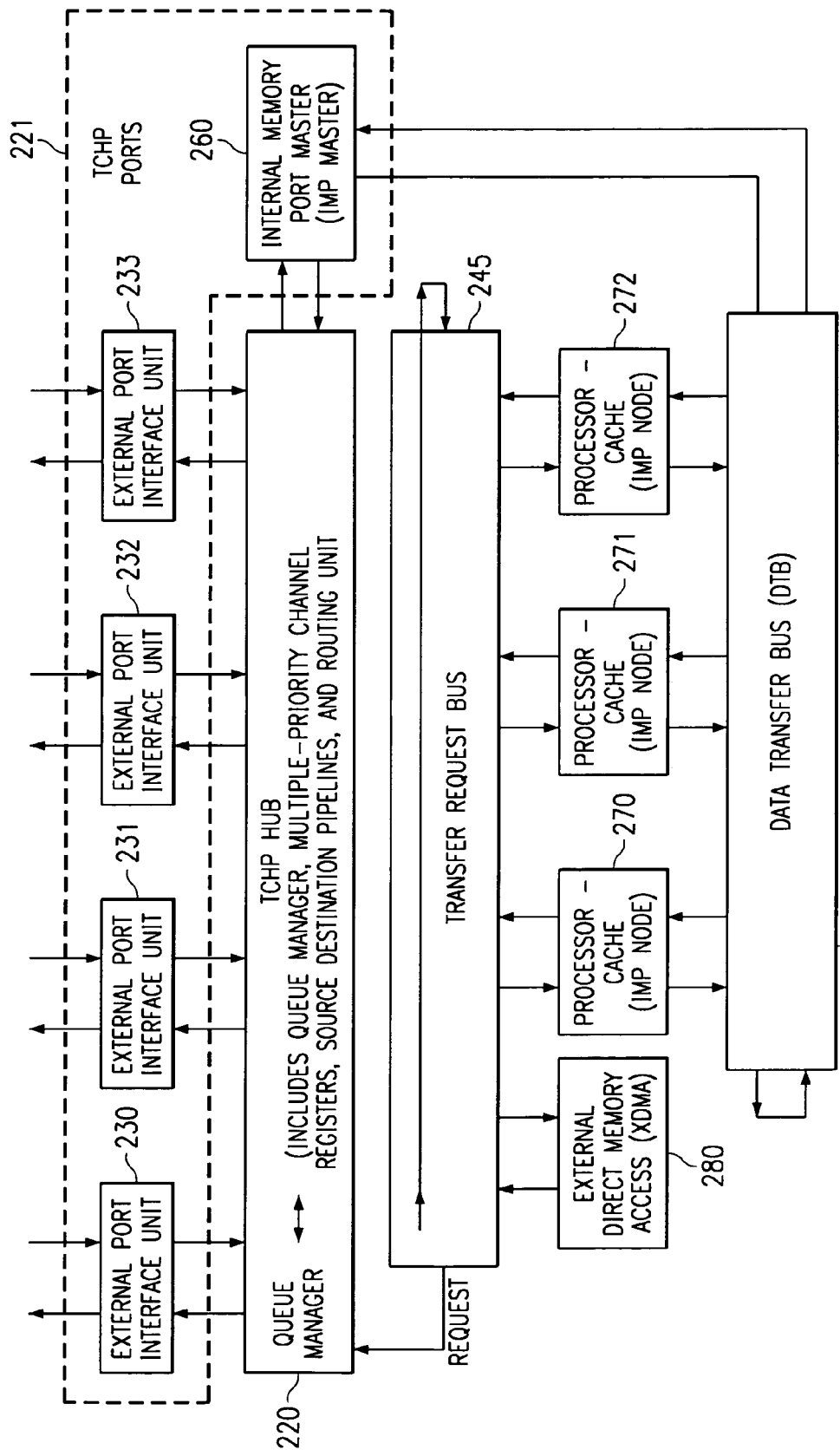
FIG. 2 illustrates the multi-processor machine with transfer controller with hub and ports architecture and associated functional units.

FIG. 2 illustrates from a higher level an overview of a multiprocessor integrated circuit employing the transfer controller with hub and ports of this invention. There are four main functional blocks. The transfer controller with hub and ports 220 and the ports, including ports external port interface units 230 to 233 and internal memory port 260, are the first two main functional blocks. Though four external port interface units 230, 231, 232 and 233 are illustrated, this is an example only and more or less could be employed. The other two main functional blocks are the transfer request bus 245 and the data transfer bus (DTB) 255. These are closely associated functional units that are but not a part of the transfer controller with hub and ports 220. Transfer request bus 245 is coupled to plural internal memory port nodes 270, 271 and 272. Though three internal port nodes 270, 271 and 272 are illustrated, this is an example only and more or less could be employed. Each of these internal memory port nodes preferable includes an independently programmable data processor, which may be a digital signal processor, and corresponding cache memory or other local memory. The internal construction of these internal memory port nodes 270, 271 and 272 is not important for this invention. For the purpose of this invention it sufficient that each of the internal memory port nodes 270, 271 and 272 can submit transfer requests via transfer request bus 245 and has memory that can be a source or destination for data. Transfer request bus 245 prioritizes these packet transfer requests. Transfers originating from or destined for internal memory port nodes 270, 271 or 272 are coupled to transfer controller with hub and ports 220 via data transfer bus 255 and internal memory port master 260. FIG. 2 highlights the possible connection of data transfer bus 255 to multiple internal memory port nodes 270, 271 and 272 and the possible connection of multiple transfer request nodes to transfer request bus 245.

Figure 3:
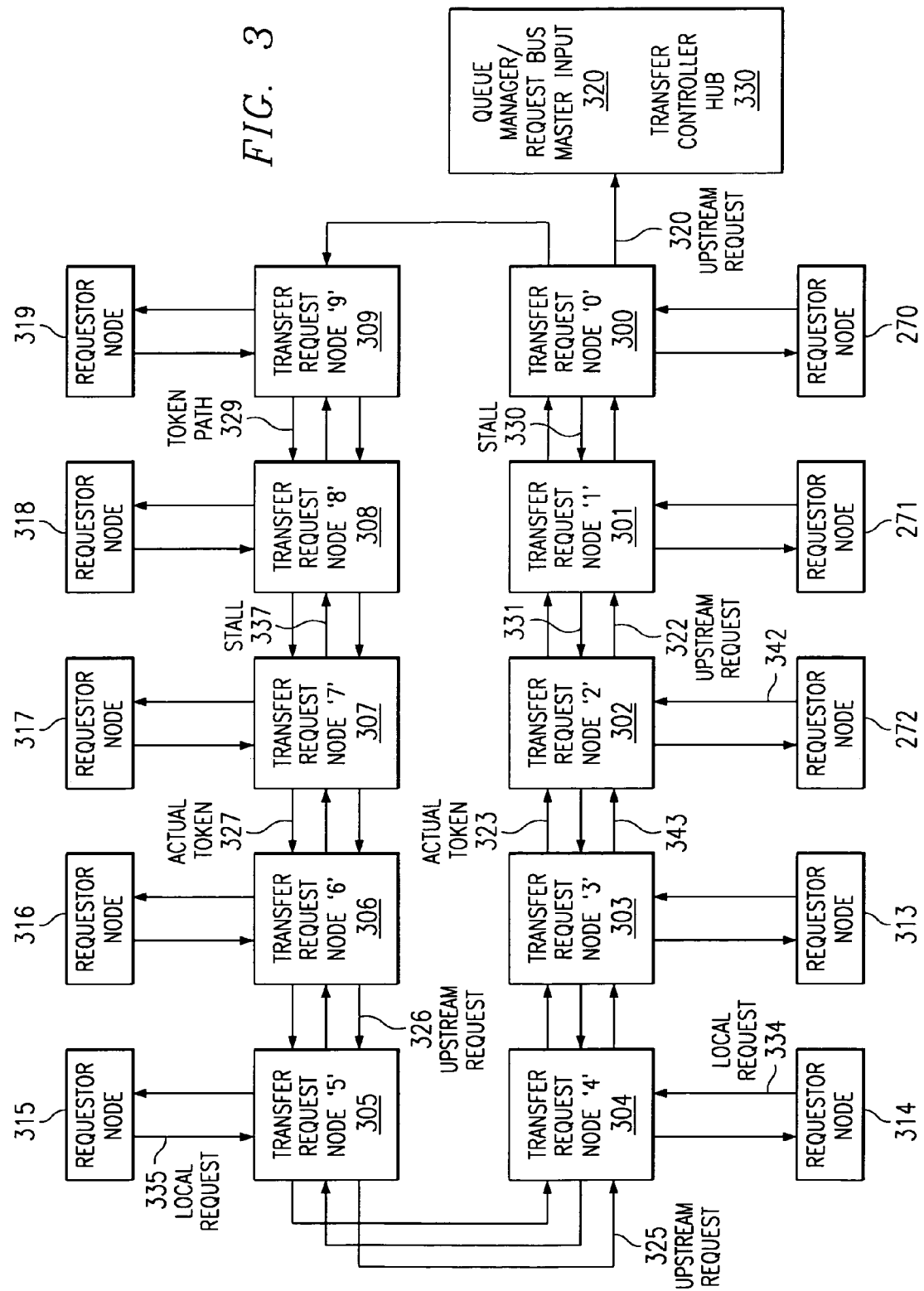
FIG. 3 illustrates the functional block diagram of the transfer request data bus.

FIG. 3 illustrates a transfer request bus at the major block level. The Processor-Cache internal memory port nodes of FIG. 2 are shown as Requestor nodes 270, 271 and 272 of FIG. 3. Other additional Requestor Nodes 313 through 319 are shown in FIG. 3. Upstream Request signals 320, 322, 325, and 326, Local Request signals 334, and 335, Stall signals 330 and 337, and Token signals 323, 327 and 329 are identified in FIG. 3 and these will now be described.

Transfer Requests

A Transfer Request (e.g. 320, 322, 325, 334, or 335) consists of one or more n bit word transfer request packets. These transfer request packets are always originated and propagated back to back on the TR bus. In other words, a local request 334 can stall and preempt an upstream request 325 only when the first upstream packet arrives. After the first packet has gone through a TR node, the local request can be injected only at the end of the upstream packet transfer.

Transfer Request Node

The TR node, in its simplest form, multiplexes between dispatching one of local or upstream requests and stalling the other one. The frequency and scaling requirements of the architecture require the stall signal to be pipelined from one TR node to another. This requires the TR nodes to have local storage so that upstream request during stall propagation will not be lost.

The stall to the local requester is also pipelined, requiring local storage for these requests as well. A node having an upstream request and a local request collide causes stalls. On a collision if the TR node does not have the token, it will pass the upstream request and stall the local request. If the TR node has the token, it will pass the local request and stall the upstream request. The upstream stall ripples up until it hits a TR node with no upstream request at that node.

Token Passing Scheme

In order to guarantee against starvation of getting a local request onto the TR bus, a token is passed downstream from node to node to give priority to the next local request for that node over the incoming upstream request. When a node receives the token, it can stall and buffer the incoming upstream request and pass its local request to the downstream node. The token passing protocol is detailed below for all possible operating scenarios:

Operating Scenario 1

No Local Request, Yes/No Upstream Request, Token In

If a TR node 302 has no local request pending or arriving in the same clock as the token arrives, then the token (see active token 323) is passed on to the next downstream node 302 in the very next clock.

Operating Scenario 2

Yes Local Request, No Upstream Request, Token In

Assume a TR node 302 has a local request pending or arriving in the same clock as the actual token 323 arrives, and there is no upstream request 343. Then the token is passed onto the next downstream node 301 in the same cycle as the first transfer request packet of local request. Note that if there is a downstream stall 331 coming back, then the token is held at the TR node until the stall goes away and the transfer of first local transfer request packet can be initiated.

Operating Scenario 3

Yes Local Request, First Transfer Request Packet of Upstream Request, Token In

Assume a TR node 302 has a local request 342 pending or arriving in the same clock as the actual token 323 arrives and also the first transfer request packet of upstream request 343 arrives in the same clock. Then the token is passed onto the next downstream node 301 in the same cycle as the first transfer request packet of local request 342, and the upstream request 343 is stalled.

Operating Scenario 4

Yes Local Request, Second Transfer Request Packet of Upstream Request, Token In

Assume a TR node 302 has a local request 342 pending or arriving in the same clock as the actual token 323 arrives and also that the second transfer request packet of the upstream request 343 arrives in the same clock. Then the token is held till the upstream request passes through, and is then passed onto the next downstream node 301 in the same cycle as the first transfer request packet of local request 342.

To summarize, the transfer request node implements the operations illustrated in Table 1.

TABLE 1

| Inputs | | | Outputs | | |
|---|---|---|---|---|---|
| Upstream Request | Local Request | Token | Downstream Request | Upstream Stall | Local Stall |
| No | No | — | None | No | No |
| Yes | No | — | Upstream Request | No | No |
| Yes | Yes | Absent | Upstream Request | No | Yes |
| Yes | Yes | Present | Local Request | Yes | No |
| No | Yes | — | Local Request | No | No |

Transfer Request Node Detailed Diagram

Figure 4:
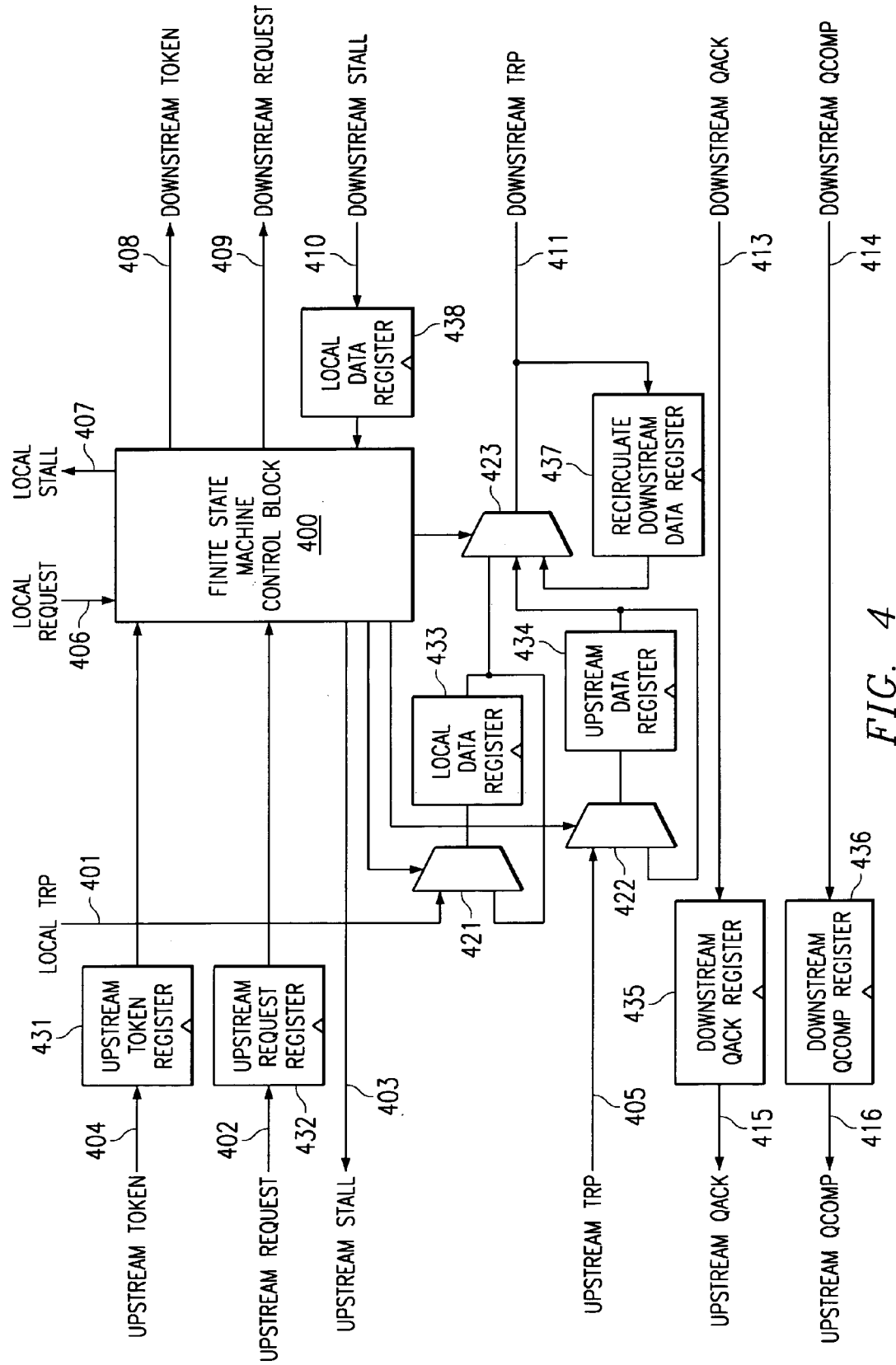
FIG. 4 illustrates a detailed block diagram of the transfer request node.

Refer to FIG. 4 for the detailed diagram of the transfer request bus node. The implementation shown is the heart of this invention. Before describing how the elements of the transfer request bus node accomplish the desired behavior of Table 1 and the four Operating Scenarios described above, it should be noted that there are two additional busses not shown in FIG. 3.

Request Acknowledgment/Completion

One of the two additional buses runs upstream and parallel to the TR bus is the requestor acknowledge bus Qack shown in FIG. 4 as 413. This bus sends the requestor ID of those transfer requests (mapped to the priority bits of the request and the requester ID of the unit submitting the request) which have been accepted by the transfer controller for servicing. This allows the local node to increment its counter of reserved space, so it may issue more transfer requests. The Qack bus is simply passed on to the local node so it that may decide based on the counter value, priority information, and Requestor ID information what operations will proceed next. The format of the Qack is, in the preferred embodiment:

Qack: <Valid Bits><Requestor_ID><Requestor_priority>

The second additional bus, also runs upstream and parallel to the TR bus and is referred to as the request completed bus, Qcomp (see 414 of FIG. 4). This request completed bus sends the report code (as specified in the TR parameters) with a valid bit on completion of the request by the I/O subsystem. The Qcomp bus is simply passed on to the local node so it may test the information contained and take the appropriate action. The report word portion of Qcomp can be encoded to carry relevant information about a transfer request completion. The format of the Qcomp, in the preferred embodiment is as follows:

Qcomp: <Valid><Requestor_ID><Report word>

Acknowledgement of completion of the transfer request may be used in control of local processor functions. The report word may indicate any exceptions or special conditions or the like.

TR Protocol

The basic TR protocol involves sending requests, and responding to stalls, while not losing any of the data. The basic mechanism of the local node interface to the TR node (to the TR bus) is to set Local Request 406 'high' whenever data is sent, and hold the same data if a stall is received on the next cycle. If there is no stall, then Local Request remains 'high', and the next data is sent to the TR node, until the entire transfer request has been sent, and then Local Request is set 'low'.

Some requirements of the local node interface are:
(1) Local Request 406 must be 'high' when data is being sent to the TR node;
(2) Once a request (local or upstream) is initiated, the entire transfer request data (two 68-bit data words) must be sent to the TR node in successive cycles (disregarding stalls);
(3) When a node receives a stall, the data sent last cycle must be resent that cycle as well;
(4) There is no guarantee about when a stall may come, so it must be comprehended in either case, whether it occurs both before, between, or after the two 68 bit words are transferred;
(5) There are no restrictions on how many transfer requests can be sent successively, although they may be stalled.

TR Node Control Logic

The heart of the TR Node control is the finite state machine which accepts the upstream token input 404, the upstream request input 402, and the downstream stall input 410.

Each of these signals is registered, the upstream token input in register 431, the upstream request input in register 432 and the stall input in register 438. The finite state machine control block 400, keeps track of the number of each type of inputs in it's counters and generates the control signals for the multiplexers and registers for the TR Node Datapath.

TR Node Datapath

The datapath in TR node is primarily devoted to multiplexing and holding the incoming upstream transfer request packets 405 and local transfer request packets 401 and also holding outgoing downstream transfer request packets 411 in case of a downstream stall.

The transfer request packets are 68 bit wide data words. Register 433 is used to register the incoming local request packet 401 and drives it through the output multiplexer 423 as downstream data 411 to the downstream node. Also in case of a stall, register 433 recirculates and holds the local request packet 401 which has arrived. Similarly register 434 keeps track of the upstream transfer request packets 405. Register 437 holds and recirculates the outgoing transfer request packets 411 in case of a downstream stall. The other paths simply involve registering and forwarding the Qack (register 435) and Qcomp busses (register 436). Downstream Qack input is labeled 413 and upstream Qack output is labeled 415. Downstream Qcomp input is labeled 414 and upstream Qcomp output is labeled 416.

Figure 5:
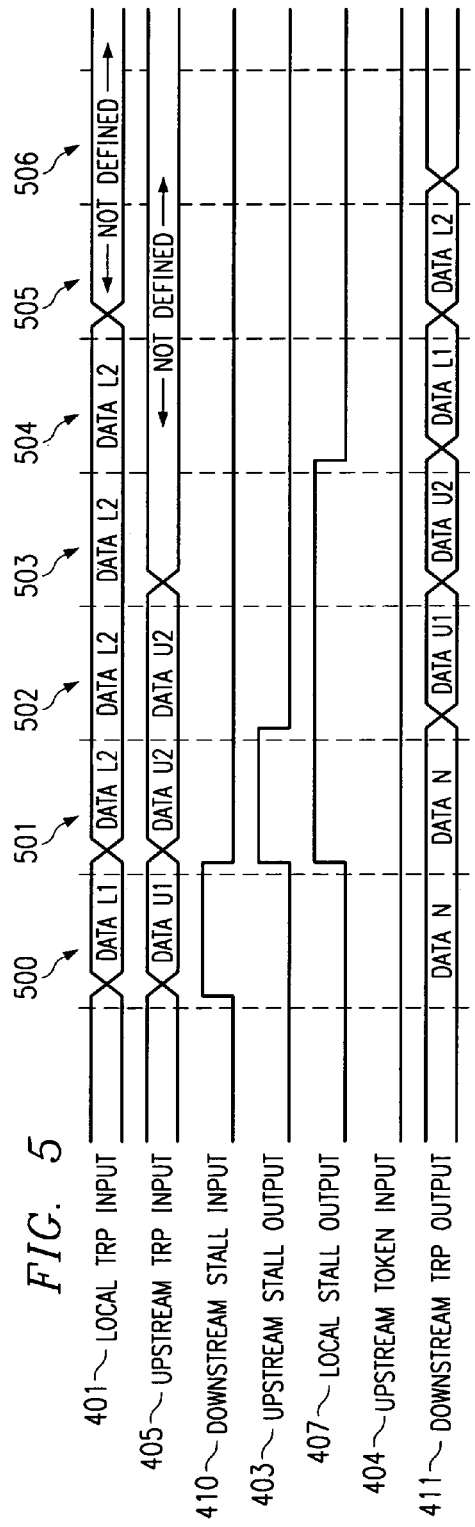
FIG. 5 illustrates waveform timing diagram for local/pstream request with downstream stall (no token to local transfer request node)

FIG. 5 illustrates the waveform diagram showing a simple request with a stall and no token present at the local TR node. During time interval 500 both a local transfer request packet 401 and an upstream transfer request packet 405 are present but a downstream stall input 410 has also been received.

During time interval 501 the downstream stall input is registered in finite state machine block (400 in FIG. 4) and is output as an active upstream stall output 403. Also during time interval 501 an active local stall output 407 is generated. The downstream transfer request packet output 411 will hold and recirculate data N as shown in FIG. 5. The local transfer request packet input 401 with Data L2 and upstream transfer request packet input 405 with Data U2 will hold their data until the downstream transfer request packet output 411 completes processing of the respective inputs. Note that recirculation of input local Data L2 and upstream Data U2 takes place in registers 433 and 434 of FIG. 4 respectively and recirculation of output downstream Data N takes place in register 437.

With no active token present at this node, the local stall output 407 persists until all upstream requests are cleared. The upstream stall output 403 however goes inactive in time interval 502 allowing the upstream requests to be completed. During time intervals 502 and 503 the upstream transfer request packet 405 Data U1 and Data U2 are cleared and passed on as downstream transfer request packets 411.

During time interval 503 no upstream request is present and the local stall 407 becomes inactive at the beginning of time interval 504.

During time intervals 504 and 505, the local stall output 407 being inactive, the local requests Data L1 and Data L2 are passed downstream.

Figure 6:
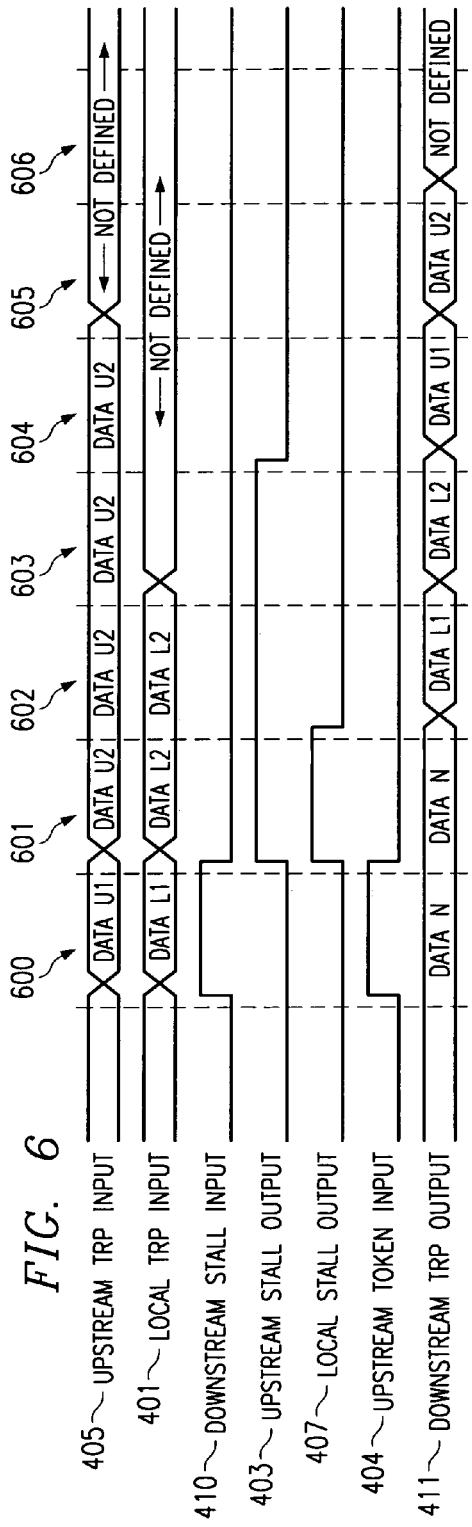
FIG. 6 illustrates waveform timing diagram for local/pstream request with downstream stall (active token present at local transfer request node).

FIG. 6 illustrates the waveform diagram showing a simple request with a stall but with an active token present at the node. During time interval 600 both a local transfer request packet 401 and an upstream transfer request packet 405 are present but a downstream stall input 410 has also been received.

With an active upstream token input 404 present at this node, the local stall output 407 persists for only through time interval 601.

During time interval 602 the local transfer request packet Data L1 receives priority and is processed and shows as an output downstream transfer request packet 411 during time interval 602. The upstream transfer request packet Data U1 is recirculated in register 434 until the local transfer request packet has been processed.

During time interval 603 the processing of the local request packet completes with the downstream transfer request packet output 411 being Data L2.

During time intervals 604 and 605 the processing of the upstream transfer request packet Data U1 and Data U2 resumes producing the downstream transfer request packet outputs Data U1 and U2 respectively.

This invention has been described in conjunction with the preferred embodiment in which the requests are for data transfer. Those skilled in the art would realize that this type request is not only type that can be serviced by this invention. This invention can be used to connect and prioritize any data processing function that can be requested by plural requesters and is serviced by a central application unit.

What is claimed is:

1. A method for scheduling service requests from a plurality of nodes, each capable of generating a service request, said method comprising the steps of:
   disposing the plurality of nodes in a chain having an upstream most node and a downstream most node, said downstream most node connected to an application device capable of servicing the service requests;
   sequentially passing a token among the plurality of nodes from the upstream most node to the downstream most node following the chain, said token passing from the downstream most node to the upstream most node in a loop;
   determining at each node whether a service request is received from a next upstream node;
   determining at each node whether that node generates a service request;
   determining at each node whether that node holds the token;
   passing a service request received at one of the plurality of nodes from a next upstream node to a next downstream node if that node does not generate a service request, the downstream most node passing the service request to the application device;

generating at the application device a service request acknowledgment upon receipt and acceptance of a service request by the application device, the service request acknowledgment indicating the node generating the accepted service request;

passing a service request received at one of the plurality of nodes from the next upstream node to the next downstream node if that node generates a service request and that node does not hold the token;

passing a service request generated by a node to the next downstream node if that node generates a service request and does not receive a service request from the next upstream node;

passing a service request generated by a node to the next downstream node if that node generates a service request and that node holds the token;

passing a service request acknowledgment received at one of the plurality of nodes from a next downstream node to said next upstream node, said downstream most node receiving said service request acknowledgment from the application device and said upstream most node discarding a received service request acknowledgment.

2. The method of claim 1, further comprising:
at each node determining if a received service request acknowledgment indicates that node;
at each node if a received service request acknowledgment indicates that node changing status at that node.

3. The method of claim 1, further comprising:
generating at the application device a service request completion signal upon completion of a service request by the application device, the service request completion signal indicating the node generating the accepted service request;
passing a service request completion signal received at one of the plurality of nodes from a next downstream node to said next upstream node, said downstream most node receiving said service request completion signal from the application device and said upstream most node discarding a received service request completion signal.

4. The method of claim 3, further comprising:
at each node determining if a received service request completion signal indicates that node;
at each node if a received service request completion signal indicates that node changing status at that node.

5. The method of claim 1, wherein:
said service requests are data transfer requests for transfer of data; and
transferring data under control of said application device in response to receipt of a data transfer request.

6. A data processing apparatus comprising:
an application device capable of servicing requested data processing operations in response to corresponding service requests and generating a service request acknowledgment indicating a requesting node upon receipt and acceptance of a service request;
a plurality of nodes disposed in a chain having an upstream most node and a downstream most node, each of said plurality of nodes having
an operation unit capable of generating service requests,
a token input for receiving a token from a next upstream node in said chain, said token input of said upstream most node receiving said token from said downstream most node,
an upstream service request input for receiving a service request from a next upstream node in said chain, said upstream most node not receiving any signal on said upstream service request input,
a local service request input for receiving a service request from said operation unit,
a downstream service request acknowledgment input for receiving a service request acknowledgment from a next downstream node in said chain, said downstream most node receiving said service request acknowledgment from said application device,
a token output for supplying said token to a next downstream node in said chain, said downstream most node supplying said token to said token input of said upstream most node,
a downstream service request output for supplying a service request to a next downstream node in said chain, said downstream most node supplying said service request to said application device,
an upstream service request acknowledgment output for supplying a service request acknowledgment to a next upstream node, said upstream most node not supplying said service request acknowledgment to any node,
a control block connected to said token input, said token output, said upstream service request input, said local service request input and said downstream service request output, said control block operative to
pass said token from said token input to said token output,
pass a service request received at said upstream service request input to said downstream service request output if that node does not generate a local service request, the downstream most node passing the service request to the application device;
pass a service request received at said next upstream service request input to said downstream service request output if that node generates a local service request and that node does not hold the token;
pass a local service request to said downstream service request output if that node generates a local service request and does not receive a service request from said upstream service request input;
pass a local service request to said downstream service request output if that node generates a local service request and that node holds the token; and
pass a service request acknowledgment received at said downstream service request acknowledgment input to said upstream service request acknowledgment output.

7. The data processing system of claim 6, wherein:
wherein said control block is further operative to
determine if a received service request acknowledgment indicates that node, and
change status at that node if a received service request acknowledgment indicates that node.

8. The data processing system of claim 6, wherein:
said application device generates a service request completion signal upon completion of a service request by the application device, the service request completion signal indicating the node generating the accepted service request;

each of said plurality of nodes includes
- a downstream service completion signal input for receiving a service request completion signal from a next downstream node, said downstream most node receiving said service request completion signal from said application device,
- an upstream service completion signal output for supplying a service request completion signal to a next upstream node, said upstream most node not supplying said service request completion signal to any node,
- said control block further operative to
  - pass a service request completion signal received at said downstream service completion signal input to said upstream service completion signal output.

9. The data processing system of claim 8, wherein:
wherein said control block is further operative to
- determine if a received service request completion signal indicates that node, and
- change status at that node if a received service request completion signal indicates that node.

10. The data processing system of claim 6, further comprising:
- a system memory connected to said application device;
- wherein said operation unit of each node is capable of generating data transfer service requests; and
- wherein said application device is capable of transferring data with said system memory in response to data transfer service requests.

* * * * *